(12) United States Patent
Fang et al.

(10) Patent No.: US 11,689,390 B2
(45) Date of Patent: *Jun. 27, 2023

(54) GATEWAY DEVICE AND SYSTEM AND METHOD FOR USE OF SAME

(71) Applicant: Enseo, LLC, Plano, TX (US)

(72) Inventors: William C. Fang, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,813

(22) Filed: Jul. 5, 2022

(65) Prior Publication Data

US 2022/0337454 A1    Oct. 20, 2022

Related U.S. Application Data

(63) Continuation of application No. 17/307,680, filed on May 4, 2021, now Pat. No. 11,381,423, which is a
(Continued)

(51) Int. Cl.
| | |
|---|---|
| *H04L 12/66* | (2006.01) |
| *H04W 4/80* | (2018.01) |
| *H04W 4/029* | (2018.01) |
| *G08B 25/01* | (2006.01) |
| *G05B 19/4155* | (2006.01) |
| *H04L 12/28* | (2006.01) |
| *H04W 76/10* | (2018.01) |

(Continued)

(52) U.S. Cl.
CPC .......... *H04L 12/66* (2013.01); *G05B 19/4155* (2013.01); *G08B 25/016* (2013.01); *G08C 17/02* (2013.01); *H04B 1/38* (2013.01); *H04L 12/2801* (2013.01); *H04W 4/029* (2018.02); *H04W 4/80* (2018.02); *H04W 8/005* (2013.01); *H04W 76/10* (2018.02); *H04W 88/16* (2013.01); *G05B 2219/49216* (2013.01); *G06F 3/04847* (2013.01); *G08C 2201/30* (2013.01); *H04W 84/12* (2013.01)

(58) Field of Classification Search
CPC ..... H04W 88/16; H04W 4/029; H04W 76/10; H04W 8/005; H04W 4/80; H04W 84/12; G08C 17/02; G08C 2201/30; H04B 1/38; G06F 3/04847
See application file for complete search history.

(56) References Cited

U.S. PATENT DOCUMENTS

| | | |
|---|---|---|
| 9,332,304 B2 | 5/2016 | Ogle et al. |
| 9,344,757 B2 | 5/2016 | Ogle et al. |
| (Continued) | | |

*Primary Examiner* — Junpeng Chen
(74) *Attorney, Agent, or Firm* — Scott Griggs; Griggs Bergen LLP (57) ABSTRACT

A gateway device and system and method for use of the same are disclosed. In one embodiment, multiple wireless transceivers are located within an in-wall housing, which also interconnectedly includes a processor, memory, various physical ports and wireless transceivers. To improve convenience, the gateway device may establish a pairing with a proximate wireless-enabled interactive programmable device. Virtual remote control functionality for various amenities may then be provided. To improve safety, the gateway device may be incorporated into a geolocation and safety network.

20 Claims, 5 Drawing Sheets

Related U.S. Application Data continuation of application No. 17/000,278, filed on Aug. 22, 2020, now Pat. No. 10,999,895.

(60) Provisional application No. 62/890,354, filed on Aug. 22, 2019.

(51) Int. Cl.
| | |
|---|---|
| *G08C 17/02* | (2006.01) |
| *H04B 1/38* | (2015.01) |
| *H04W 8/00* | (2009.01) |
| *H04W 88/16* | (2009.01) |
| *G06F 3/04847* | (2022.01) |
| *H04W 84/12* | (2009.01) |

(56) References Cited

U.S. PATENT DOCUMENTS

| | | | |
|---|---|---|---|
| 9,357,254 | B2 | 5/2016 | Ogle et al. |
| 9,654,826 | B2 | 5/2017 | Ogle et al. |
| 9,654,827 | B2 | 5/2017 | Ogle et al. |
| 9,712,872 | B2 | 7/2017 | Ogle et al. |
| 9,800,932 | B2 | 10/2017 | Ogle et al. |
| 9,832,490 | B2 | 11/2017 | Ogle et al. |
| 9,892,630 | B1 | 2/2018 | Strods |
| 10,075,334 | B1 | 9/2018 | Kozura |
| 10,091,534 | B2 | 10/2018 | Ogle et al. |
| 10,104,402 | B2 | 10/2018 | Ogle et al. |
| 10,142,662 | B2 | 11/2018 | Ogle et al. |
| 10,219,202 | B1 | 2/2019 | Malasani |
| 10,602,195 | B2 | 3/2020 | Ogle et al. |
| 10,659,821 | B2 | 5/2020 | Ogle et al. |
| 10,848,789 | B2 | 11/2020 | Fang |
| 2011/0099575 | A1 | 4/2011 | Woo et al. |
| 2015/0382436 | A1* | 12/2015 | Kelly ............. H05B 47/19 315/131 |
| 2016/0111878 | A1* | 4/2016 | Qureshi ............. H01R 24/30 29/622 |
| 2016/0277796 | A1 | 9/2016 | Ogle et al. |
| 2017/0251256 | A1 | 10/2017 | Ogle et al. |
| 2017/0251229 | A1 | 11/2017 | Ogle et al. |
| 2017/0318341 | A1 | 11/2017 | Ogle et al. |
| 2018/0077459 | A1 | 3/2018 | Ogle et al. |
| 2019/0037248 | A1 | 1/2019 | Ogle et al. |
| 2019/0045229 | A1 | 2/2019 | Ogle et al. |
| 2019/0098340 | A1 | 3/2019 | Ogle et al. |
| 2019/0357339 | A1 | 11/2019 | Kim |
| 2020/0037004 | A1 | 1/2020 | Fang |
| 2020/0132801 | A1 | 4/2020 | Fang |
| 2020/0137452 | A1 | 4/2020 | Miller |
| 2020/0137453 | A1 | 4/2020 | Fang |
| 2020/0137524 | A1 | 4/2020 | Miller |
| 2020/0212959 | A1* | 7/2020 | Eriksen ............. H02H 1/0092 |
| 2021/0258192 | A1 | 8/2021 | Fang et al. |

* cited by examiner

GATEWAY DEVICE AND SYSTEM AND METHOD FOR USE OF SAME

PRIORITY STATEMENT & CROSS-REFERENCE TO RELATED APPLICATIONS

This application is a continuation of U.S. patent application Ser. No. 17/307,680, entitled "Gateway Device and System and Method for Use of Same" and filed on May 4, 2021, in the names of William C. Fang et al., now U.S. Pat. No. 11,381,423 and issued on Jul. 5, 2022; which is a continuation of U.S. patent application Ser. No. 17/000,278, entitled "Gateway Device and System and method for Use of Same" and filed on Aug. 22, 2020, in the names of William C. Fang, et al., now U.S. Pat. No. 10,999,895 and issued on May 4, 2021; which claims priority from Provisional U.S. Patent Application No. 62/890,354, entitled "Gateway Device and System and Method for Use of Same" and filed on Aug. 22, 2019, in the name of William C. Fang; all of which are hereby incorporated by reference, in entirety, for all purposes.

TECHNICAL FIELD OF THE INVENTION

This invention relates, in general, to gateway devices and, in particular, to gateway devices with enhanced convenience and systems and methods for use of the same that address and enhance the automation of solutions in a room or other environment.

BACKGROUND OF THE INVENTION

Without limiting the scope of the present invention, the background will be described in relation to the hospitality lodging industry, as an example. To many individuals, a hotel room is more than just a place to sleep, rather it is part of a larger and hopefully positive, hospitality experience. Hotel guests are seeking enhanced convenience in an easy-to-use platform to make this experience a reality. As a result of such consumer preferences, hassle free connectivity and confidence inspiring control of room amenities are differentiators in determining the experience of guests staying in hospitality lodging establishments. Accordingly, there is a need for improved systems and methods for providing enhanced convenience in an easy-to-use platform in the hospitality lodging industry.

SUMMARY OF THE INVENTION

It would be advantageous to achieve a gateway device that would improve upon existing limitations in functionality. It would be desirable to enable a computer-based electronics and software solution that would provide enhanced convenience in an easy-to-use platform in the hospitality lodging industry or in another environment. Further, it would also be desirable to enable a computer-based electronics and software solution that would provide improved safety in a reliable platform. To better address one or more of these concerns, a gateway device and system and method for use of the same are disclosed.

In one embodiment, multiple wireless transceivers are located within an in-wall housing, which also interconnectedly includes a processor, memory, various physical ports and wireless transceivers. To improve convenience, the gateway device may establish a pairing with a proximate wireless-enabled interactive programmable device. Virtual remote control functionality for various amenities may then be provided. To improve safety, the gateway device may be incorporated into a geolocation and safety network. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
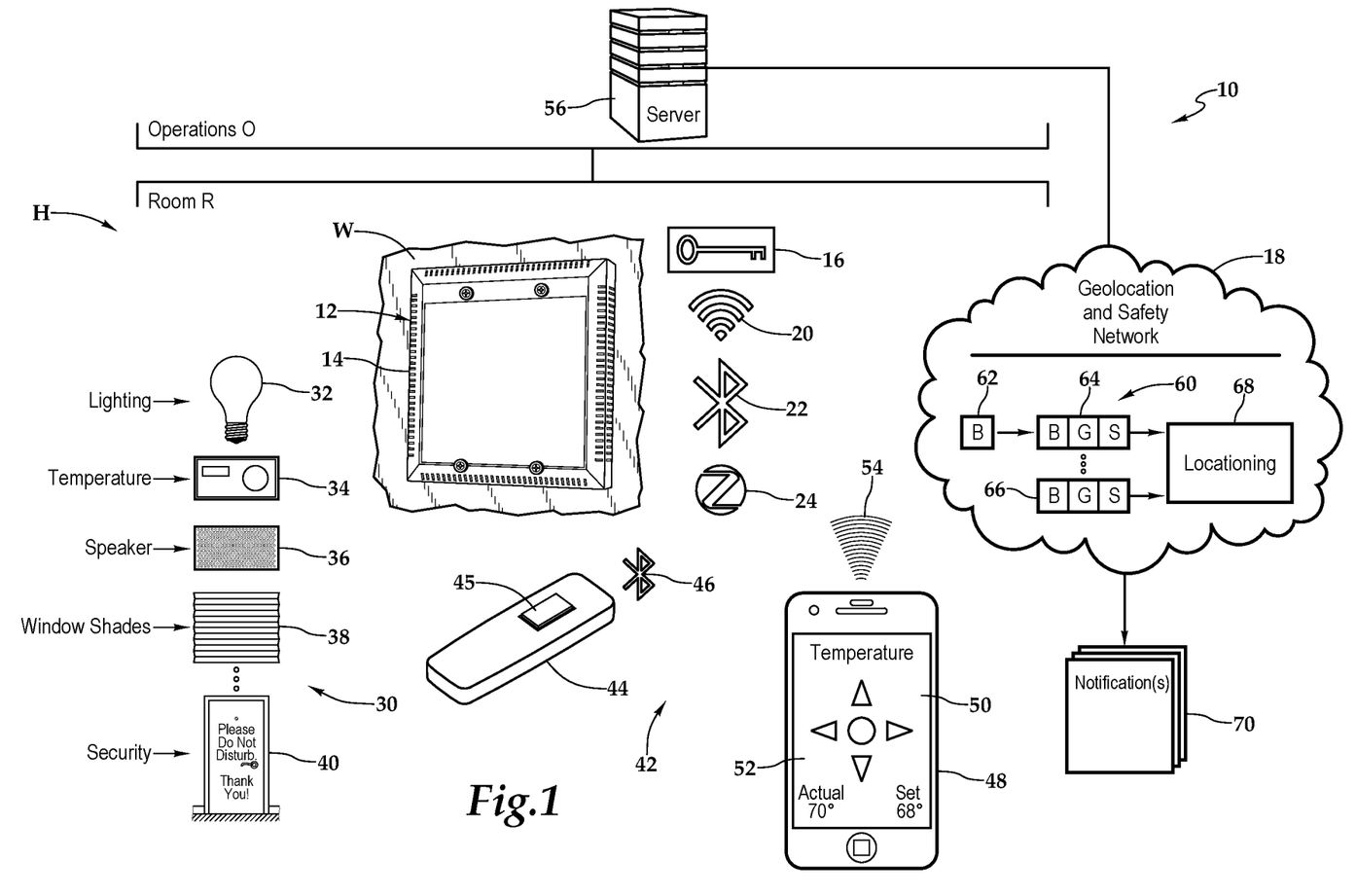
FIG. 1 is a schematic diagram depicting one embodiment of a system for providing a gateway device providing enhanced convenience and safety functionality therewith according to the teachings presented herein.

Referring initially to FIG. 1, therein is depicted one embodiment of a system 10 utilizing a gateway device 12 with enhanced content capabilities and safety capabilities being employed within a hospitality lodging establishment, as an example. The hospitality lodging establishment or, more generally, hospitality property, may be a furnished multi-family residence, dormitory, lodging establishment, hotel, hospital, or other multi-unit environment. More generally, the system 10 and the teachings presented herein are applicable to any multi-unit environment including hospitality environments, educational campuses, hospital campuses, office buildings, multi-unit dwellings, sport facilities and shopping malls, for example.

As shown, by way of example and not by way of limitation, the hospitality environment is depicted as the hotel H having various rooms and spaces, including room R and back of the house operations O. As will be discussed in additional detail, the gateway device 12 is communicatively disposed with various amenities associated with the hospitality environment or hotel H as well as a geolocation and safety network 18. Gateway devices, like the gateway device 12, may be deployed throughout the spaces S and rooms of the hotel H.

As shown, in one embodiment, within the room R, for example, the system 10 includes the gateway device 12 having an in-wall profile with a housing 14 at wall W. A configuration profile 16 provides the information and credentials necessary for the gateway device 12 to have convenient connections to amenities and a safe experience for the guests as well as workers at the hotel H through the geolocation and safety network 18, as will be described below. Multiple antennas provide for the wireless capabilities of the gateway device 12 and include, for example, wireless standards: Wi-Fi 20, Bluetooth 22, and ZigBee 24. More generally, it should be appreciated that the wireless standards presented in FIG. 1 are depicted for illustrative purposes.

The gateway device 12 communicates wirelessly with various amenities 30, which are depicted as environmental amenities, within an environment of the room R. As shown, the amenities may include lighting 32, a thermostat 34 representing temperature control, a speaker 36, window shades 38, and security 40, which is depicted as a door indication for "Please Do Not Disturb." A programmable device 42, such as a single button programmable device 44 having a button 45 with Bluetooth capabilities 46 or a proximate wireless-enabled interactive programmable device 48 may be in communication with the gateway device 12 by a wireless standard. As shown, the proximate wireless-enabled interactive programmable device may be a wireless-enabled interactive handheld device that may be supplied or carried by the guest or employee or manager, for example, and may be selected from a range of existing devices, such as, for example personal computers, laptops, tablet computers, smart phones, and smart watches, for example. In one implementation, an application installed from a server enables the gateway device 12 and the proximate wireless-enabled interactive programmable device 48 to be wirelessly paired. In another embodiment, a challenge-response is utilized to wirelessly pair the gateway device 12 and the proximate wireless-enabled interactive programmable device 48.

As shown, the configuration profile 16 is loaded within the gateway device 12. The guest configuration profile may be loaded from the operations, e.g., the front desk or hotel headend, by use of a remote control, or by a proximate device, such as the proximate wireless-enabled interactive programmable device 48. The configuration profile 16 enables, in operation, to query the status of one of the amenities, to furnish virtual remote control functionality of the amenities 30 that may be provided by the proximate wireless-enabled interactive programmable device 48, and to import content from the proximate wireless-enabled interactive programmable device to one of the amenities 30, such as the speaker 36. Such functionality is depicted by the proximate wireless-enabled interactive programmable device 48 having a display 50 and a virtual interface 52 thereon for controlling the temperature of the temperature control amenity 34 by way of a Wi-Fi wireless signal 54 that is received by the gateway device 12 and transmitted to the temperature control 34.

In another implantation, the gateway device 12 has a data link to the server 56 which is providing the geolocation and safety network 18, which includes the gateway device 12 as well as the programmable device 42 in the form of the single button programmable device 44 or the proximate wireless-enabled interactive programmable device 48. In one implementation, an individual has the programmable device 44, which may transmit a beacon from the programmable device 44 using a wireless standard such as Bluetooth 46 to the gateway device 12. The gateway device 12 then processes the received beacon signal and sends a broadcast signal to the server 56. More particularly, with respect to data flow 60, the programmable device 44 transmits the beacon signal 62 which includes a personal location device identification identifying the programmable device 44. The beacon signal 62 is received by the gateway device 12 which transmits a broadcast signal 64 including the personal location device identification, a gateway device identification identifying the gateway device 12, and a signal characteristic indicator, such as signal strength, for example. The server 56 receives the broadcast signal 64 and uses multiple broadcast signals, including broadcast signal 66, for locationing 68, such as triangulation, of the location of the programmable device 44. The server 56, in turn, sends out the appropriate notifications 70 to various phones, activates alarms, or notify others via a computer, depending on the situation. As a spatial array of horizontal and vertical gateway devices may be provided, the server 56 and system presented herein is able to determine the location of the individual associated with the programmable device 44 within a building. The location information determined includes which floor the individual is presently located as well as the room or common area.

Figure 2:
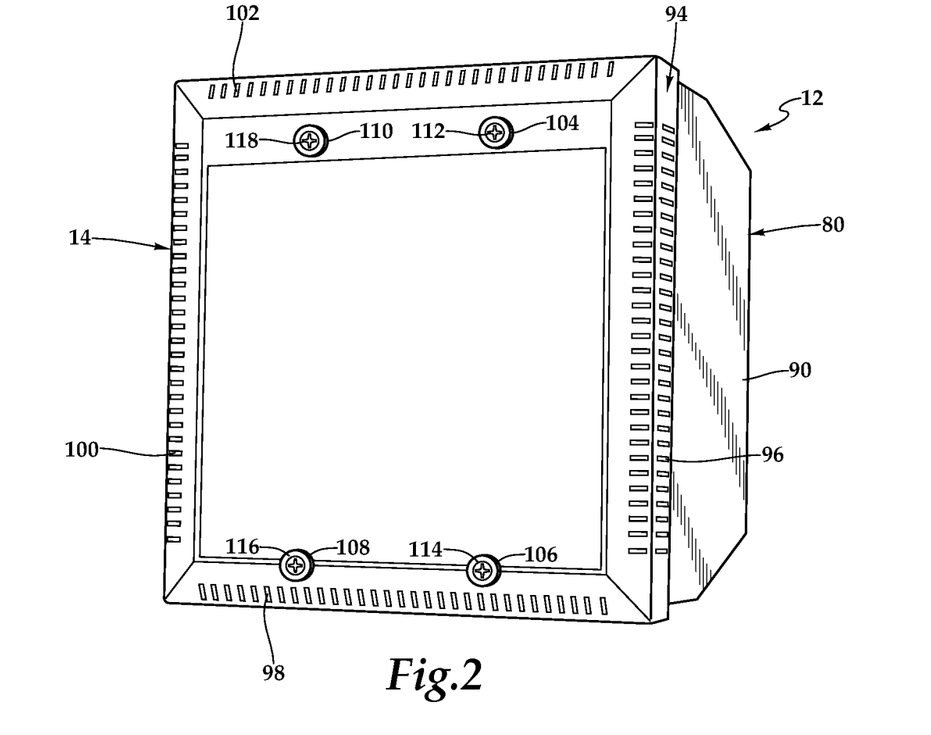
FIG. 2 is a front perspective view of the gateway device presented in FIG. 1.
Figure 3:
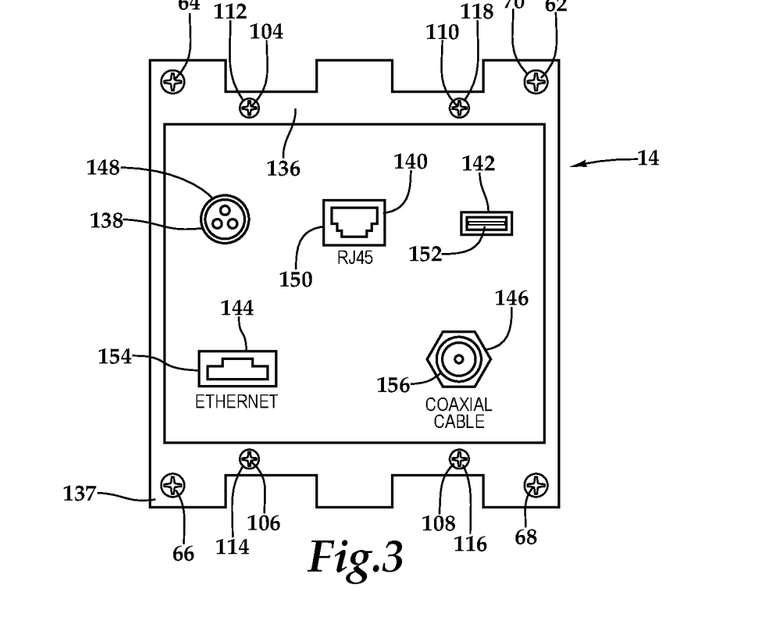
FIG. 3 is a rear elevation view of another embodiment of the gateway device presented in FIG. 1.
Figure 4:
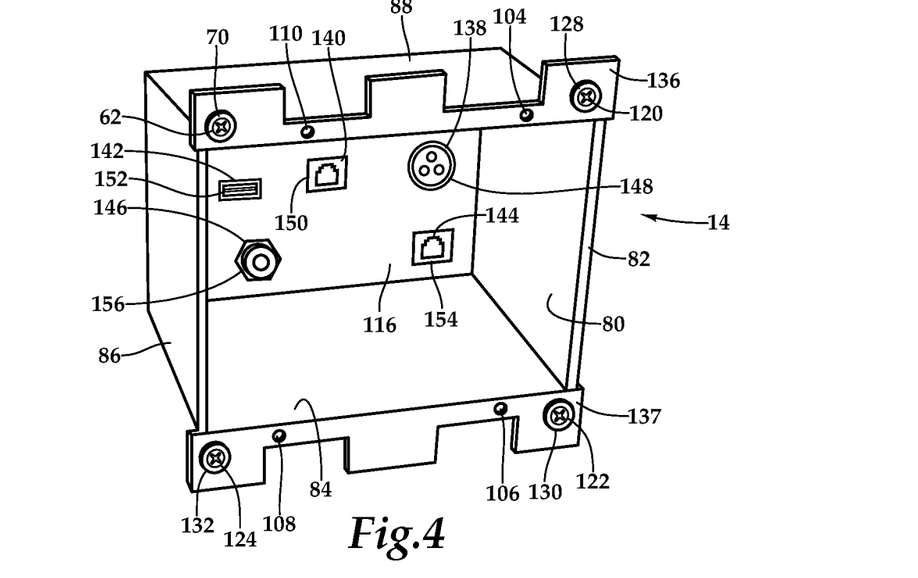
FIG. 4 is a front perspective view of a housing associated with the gateway device presented in FIG. 1.

Referring now to FIG. 2, FIG. 3, and FIG. 4, as mentioned, the gateway device 12 is mounted within the wall W. The gateway device 12 may include the housing 14, which, as shown, is a utility box 80 having an open end and four side walls 84, 86, 88, 90 as well as a rear wall 92, which is opposite the open end 82. The housing 14 may include an in-wall electrical box and the utility box 80 may be a single gang utility box or double gang utility box, for example. A panel 94, which is configured to substantially mount flush with the wall W, mates with the open end 82 of the utility box 80 to form a front portion of the housing 14. As shown, the panel 94 includes vents and, in particular, vents 96, 98, 100, 102. Although, it should be appreciated that any configuration of vents may be utilized.

Multiple mounting holes are located in the panel to accept fasteners, such as screws, which are driven into corresponding mounting holes at an edge of the open end 82 of the utility box 80. In the illustrated embodiment, four mounting holes 104, 106, 108, 110 and four respective screws 112, 114, 116, 118 are employed to secure the panel 94. Similarly, the utility box 80 may include wall mounting holes and corresponding fasteners and brackets for securing the gateway device 12 within the wall W. As shown, the utility box 80 includes fasteners 120, 122, 124, 126 for mating with mounting holes 128, 130, 132, 134 at flanges 136, 137 which extend from the open end 82 of the utility box 16.

Ports, disposed within respective openings defined by the housing 14, receive respective optio-electric connectors, which may be optical or electrical, for example, that include optio-electrically conductive elements. The ports may be configured to provide a connection to external audio-visual devices, such as televisions, and external sources of signal for the external audio-visual devices, such as coaxial cable, fiber, ethernet, USB devices, etc. By way of example and not by way of limitation, the ports and associated optio-electric connectors may include RJ45, serial, IR Input, service/control, USB, video, ethernet, L/R audio cable, and digital audio optical. As shown, in one implementation, the panel 94 is flat. It should be appreciated, however, the panel 94 may include openings and ports for various optio-electric connectors, such as: video output (HDMI-HDCP), video input (HDMI-HDCP), video input (HDMI-HDCP), ethernet, display control (ethernet), digital audio, left audio output, and right audio output. With respect to the rear wall 92, openings 138, 140, 142, 144, 146 for corresponding ports 148, 150, 152, 154, 156 which further correspond to the respective following optio-electric connectors: power, RJ45, USB, ethernet, and coaxial cable. The ethernet connector may be a CAT5 or CAT6 connection, for example. It should be appreciated that although one architecture of openings, ports, and optio-electric connectors is depicted, the location and types of openings, ports, and optio-electric connectors may vary with the teachings presented herein and FIG. 2 through FIG. 4 present only a non-limiting example. As described, each port includes a multiple optio-electrically conductive elements for coupling to the circuit board. The optio-electrically conductive elements couple an external source of signal to the gateway device 12. As depicted, all input sources are located in the utility box 80, whether a side wall 84, 86, 88, 90 or a rear wall 92, as shown.

Figure 5:
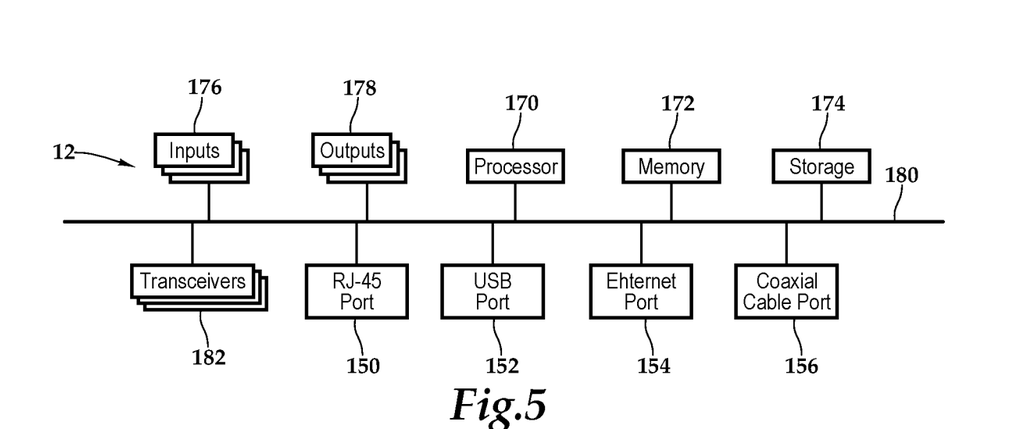
FIG. 5 is a functional block diagram depicting one embodiment of the gateway device presented herein.

Referring to FIG. 5, within the housing 14, a processor 170, memory 172, storage 174, inputs 176, and outputs 178 are interconnected by a bus architecture 180 within a mounting architecture. The RJ-45 port 150, USB port 152, ethernet port 154, and coaxial cable port 156 are also interconnected into the bus architecture 180. The processor 170 may process instructions for execution within the computing device, including instructions stored in the memory 172 or in storage 174. The memory 172 stores information within the computing device. In one implementation, the memory 172 is a volatile memory unit or units. In another implementation, the memory 172 is a non-volatile memory unit or units. Storage 174 provides capacity that is capable of providing mass storage for the gateway device 12. Various inputs 176 and outputs 178 provide connections to and from the computing device, wherein the inputs 176 are the signals or data received by the gateway device 12, and the outputs 178 are the signals or data sent from the gateway device 12. Power may be provided by the aforementioned power port 138. Power may also be provided as power of ethernet by way of the ethernet port 154. The RJ-45 port 150, USB port 152, ethernet port 154, and coaxial cable port 156 may provide physical connections to the amenities 30 and/or the geolocation and safety network 18 and the server 56.

Multiple transceivers 182 are associated with the gateway device 12 and communicatively disposed with the bus 180. As shown the transceivers 182 may be internal, external, or a combination thereof to the housing. Further, the transceivers 182 may be a transmitter/receiver, receiver, or an antenna for example. Communication between various amenities in the room R and the gateway device 12 may be enabled by a variety of wireless methodologies employed by the transceiver 182, including 802.11, 802.15, 802.15.4, 3G, 4G, Edge, Wi-Fi, ZigBee, near field communications (NFC), Bluetooth low energy and Bluetooth, for example. Also, infrared (IR) may be utilized. The multiple transceivers 182 may also provide a wireless connection to the geolocation and safety network 18 and server 56.

The memory 172 and storage 174 are accessible to the processor 170 and include processor-executable instructions that, when executed, cause the processor 170 to execute a series of operations. With respect to first processor-executable instructions, the processor 170 is caused to establish a pairing between the proximate wireless-enabled interactive programmable device 42 and the gateway device 12. The processor-executable instructions then send user interface instructions relative to the amenity to the proximate wireless-enabled interactive programmable device 48. The instructions may further cause the processor 170 to receive and process user input instructions relative to the amenity 30 from the proximate wireless-enabled interactive programmable device 48. The processor-executable instructions may also cause the processor 170 to generate a command signal and send the command signal to the amenity 30.

The memory 172 may also include second processor-executable instructions that, when executed, cause the processor 170 to receive and process a beacon signal including a personal location device identification. The instructions may then cause the processor 170 to generate a gateway signal including the personal location device identification, a gateway device identification, and signal characteristics indicator. Finally, the instructions may cause the processor 170 to send the gateway signal to the server 56.

The memory 172 may also include third processor-executable instructions that, when executed, cause the processor 170 to establish a pairing between the proximate wireless-enabled interactive programmable device 48 and the gateway device 12. Following the establishment of a pairing, the processor-executable instructions may cause the processor 170 to send user interface instructions relative to the amenity 30 to the proximate wireless-enabled interactive programmable device 48. The instructions may then cause the processor 170 to receive and process user input instructions relative to the amenity from the proximate wireless-enabled interactive programmable device 48. As part of the status inquiry process, the processor-executable instructions may then generate a status inquiry, send the status inquiry to the amenity 30, receive a response to the status inquiry at the gateway device 12, and forward a status response to the proximate wireless-enabled interactive programmable device 48.

Thus, the systems and methods disclosed herein may enable users to use existing electronic devices as a temporary remote control device to control various amenities. Therefore, the systems and methods presented herein avoid the need for additional or expensive high functionality remote controls. In this respect, the teachings presented herein also include providing the software and/or application for the electronic device or interactive handheld device. The application, to the extent needed, may be downloaded from the Internet or alternatively made available by download from the set-top box. Further, the systems and methods disclosed herein may enable users to be part of a geolocation and safety network.

In one embodiment, the in-wall gateway device 12 has Internet of Things (IOT) functionality to control amenities using the wireless transceivers 182 with a wireless communication protocol such as 802.15.4 radio with Zigbee, Thread, or another Wi-Fi protocol. Alternatively, a physical port and physical connection, such as the USB port 152, may utilize a universal serial bus standard like USB5 to control one or more of the amenities. Communication with the server 56 may be achieved via the wireless transceivers 182 or by way of the ethernet port 154 using a wired-ethernet standard such as CAT5 or CAT6, for example.

In one embodiment, the in-wall gateway device 12 has connectivity to the geolocation and safety network 18 by way of a backhaul connection to the server 56. This connection may be accomplished by the ethernet port 154 using a wired-ethernet standard such as CAT5 or CAT6, for example. Alternatively, connectivity to the server 56 may be provided by the wireless transceivers 182 with a wireless communication protocol. As another alternative, connectivity to the server 56 may be furnished by the coaxial cable port 156 using a Data Over Cable Service Interface Specification (DOCSIS) connection, for example. The in-wall gateway device 12 may receive beacons from various wireless-enabled interactive programmable devices 48 using a wireless connection such as Bluetooth low energy or a 2.4 proprietary protocol, for example. Power may be provided by a Power over Ethernet (PoE) connection furnished by the ethernet port 154. Alternatively, a separate AC power connection may be provided.

Figure 6:
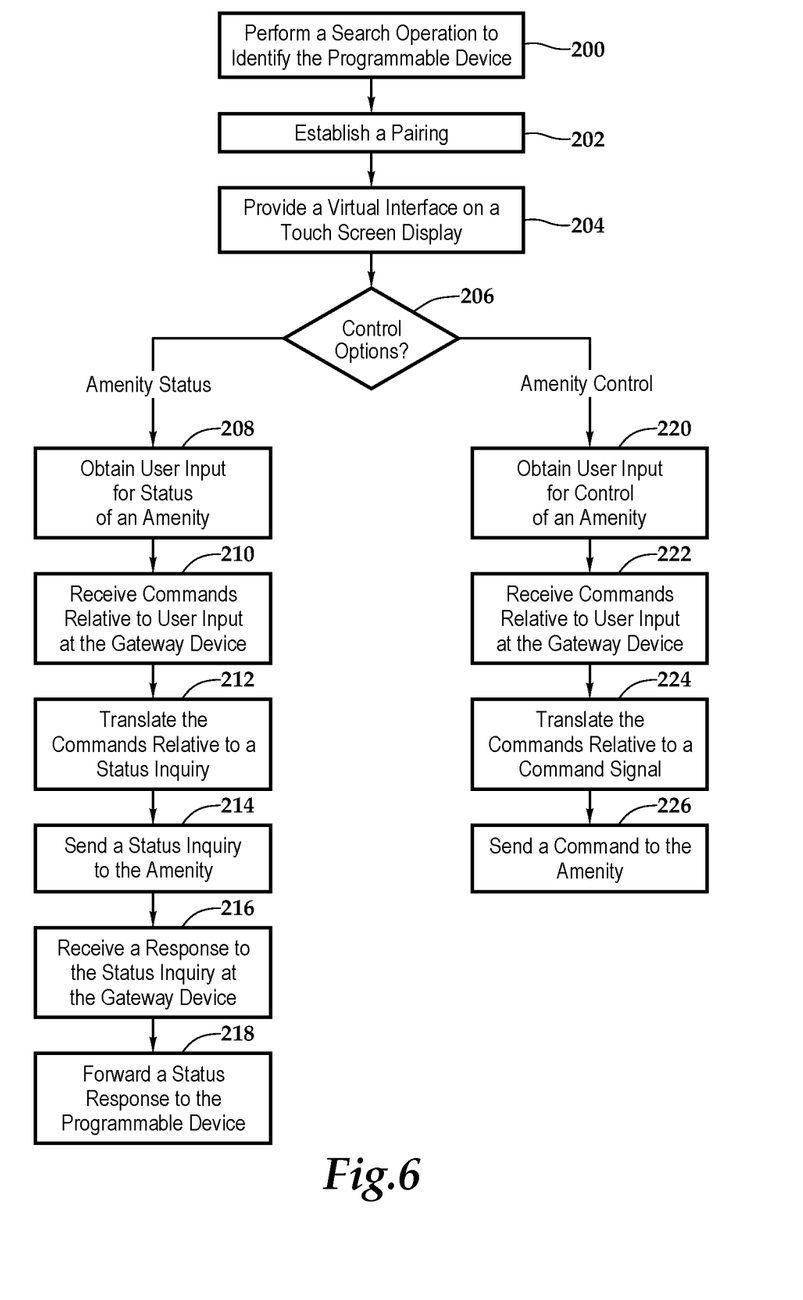
FIG. 6 is a flow chart depicting one embodiment of a method for providing a gateway device having enhanced convenience according to the teachings presented herein.

FIG. 6 depicts one embodiment of a method for providing convenience through a remote control device controlling amenities, according to the teachings presented herein. At block 200, a search, which may be active or passive, is performed by the gateway device to identify a physically proximate programmable device in the multi-room environment, for example. At block 202, a pairing is established. As noted by block 204, the pairing may provide an experience that includes providing a virtual interface with virtual buttons, for example. Referring to decision block 206, as previously discussed, the virtual remote controls and interface each correspond to amenities under the control of the gateway device and, as a result, the status may be determined of the amenity or the amenity may be controlled.

With respect to amenity status, at block 208, instructions are provided to the proximate wireless-enabled interactive programmable device to enable requests for the status of an amenity. At block 210, commands are received at the gateway device relative to user input and a status inquiry. At block 212, the commands are translated and at block 214 a status inquiry is sent to the amenity. At block 216, a response to the status inquiry is received at the gateway device and forwarded to the proximate wireless-enabled interactive programmable device at block 218.

With respect to control of amenities, at block 220, instructions are provided from the gateway device for a virtual interface on a touch screen display associated with the proximate wireless-enabled interactive programmable device. In one embodiment, the virtual buttons are associated with the proximate wireless-enabled interactive programmable device and relate to obtaining user input for the amenity control functionality provided by the set-top box. At block 222, the set-top box receives and processes amenity control functionality input instructions from the proximate wireless-enabled interactive programmable device. At block 224, the commands are translated into a command signal. At block 226, the command signal is sent to the particular amenity.

Figure 7:
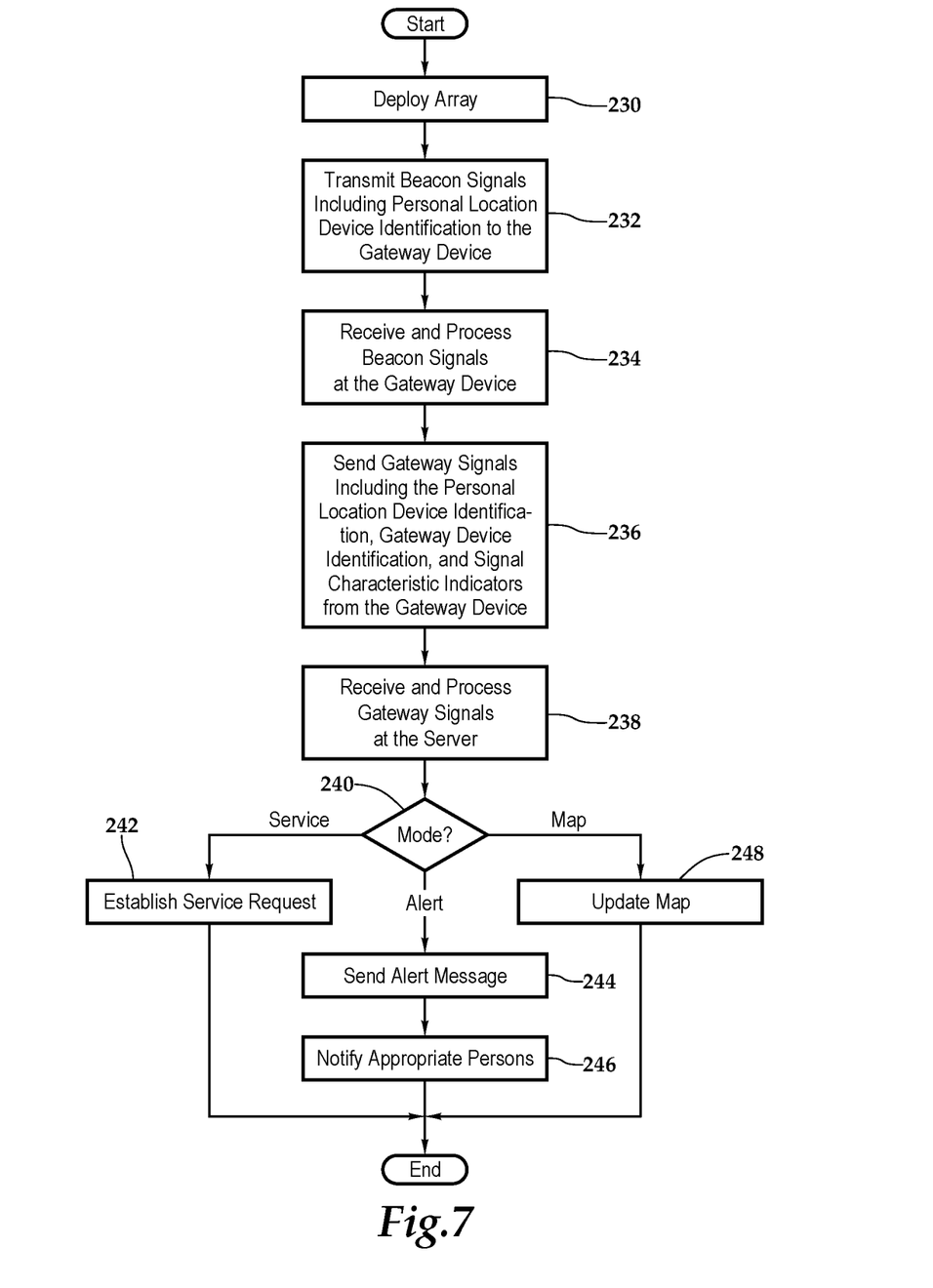
FIG. 7 is a flow chart depicting one embodiment of a method for providing a gateway device furnishing enhanced safety according to the teachings presented herein.

FIG. 7 depicts one embodiment of a method for providing safety in a hospitality environment or other environment, according to the teachings presented herein. At block 230, the array of gateway devices is deployed vertically and horizontally throughout the hospitality environment. It should be appreciated, however, that the systems and methods presented herein apply to horizontal arrays of gateway devices as well. At block 232, beacon signals are periodically transmitted from personal location devices and received by the gateway devices.

At block 234, the beacon signals are received and processed at the gateway device. The beacon signals may include a personal location device identification corresponding to the device being employed by the user. In one embodiment, signal characteristics of the beacon signals such as signal strength or phase angle measurements or flight time measurements may be utilized. At block 236, gateway signals are sent from the gateway devices to a server that is part of the geolocation and safety network. The gateway signals may include the personal location device identification, gateway device identification, and signal characteristic indicators. At block 238, the server receives and processes the gateway signals. At this step, the server may identify the location of the origin of the beacon signal and estimate the location of the personal location device. At decision block 240, the server takes action based on the mode of operation. In a first mode of operation at block 242, a service request is associated with the location of the user utilizing the location of the personal location device such as the wireless-enabled interactive programmable device as a proxy. In a second mode of operation at block 244, an emergency alert is sent and subsequent notification (block 246) occurs. The emergency alert includes an indication of distress and the location of the user utilizing the location of the wireless-enabled interactive programmable device as a proxy. In a third mode of operation at block 248, a map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued.

The gateway device and systems and methods presented herein are particularly applicable to non-hotel guest room applications like hallways as well as the aforementioned educational environments, including hallways, gymnasiums, cafeterias and libraries. In such applications, the cameras on the gateway devices may be activated by a signal from the server following an alert, for example. Alternatively, the cameras may self-actuate following an alert from a personal location device. The video feed or video feeds received at the server may be utilized by safety and security personal or law enforcement to assess the situation.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A gateway device comprising:
    a housing securing a processor and memory therein, the housing being configured to be mounted within a wall located within a space, the housing including a utility box being an in-wall portion and a panel configured to mount thereto, the utility box having a plurality of sidewalls and a rear wall;
    the panel forming a front portion of the housing, the panel including vents, the panel configured to mount substantially flush with the wall;
    a busing architecture communicatively interconnecting the processor and the memory;
    a first physical port secured at the housing and coupled to the busing architecture, the first physical port configured to provide a physical wired interface for data and power to the gateway device, the first physical port being located at the rear wall in the utility box;

a plurality of wireless transceivers associated with the housing and coupled to the busing architecture, the plurality of wireless transceivers configured to communicate via a plurality of wireless standards;

the first physical port providing a power connection to the gateway device;

the first physical port providing a data link to a server, the server managing a geolocation and safety network including a plurality of gateway devices;

at least one of the plurality of wireless transceivers being configured to communicate with a proximate wireless-enabled interactive programmable device;

at least one of the plurality of wireless transceivers being configured to communicate with a proximate amenity, the proximate amenity being co-located with the gateway device at the space;

the memory accessible to the processor, the memory including first processor-executable instructions that, when executed, cause the processor to:
receive and process user input instructions relative to the amenity from the proximate wireless-enabled interactive programmable device; and the memory accessible to the processor, the memory including second processor-executable instructions that, when executed, cause the processor to:
receive and process a beacon signal including a personal location device identification,
generate a gateway signal including the personal location device identification, a gateway device identification, and signal characteristics indicator, and
send the gateway signal to the server via the data link.

2. The gateway device as recited in claim 1, wherein the housing further comprises an in-wall electrical box.

3. The gateway device as recited in claim 1, wherein the utility box further comprises a box selected from the group consisting of single gang utility boxes and double gang utility boxes.

4. The gateway device as recited in claim 1, wherein the first physical port further comprises an RJ45 port.

5. The gateway device as recited in claim 1, wherein the first physical port comprises a connection selected from the group consisting of CAT5 connections, CAT6 connections, and Ethernet connections.

6. The gateway device as recited in claim 1, wherein the wireless standards are selected from a group consisting of infrared (IR), 802.11, 802.15, 802.15.4, 3G, 4G, Edge, Wi-Fi, ZigBee, near field communications (NFC), and Bluetooth.

7. The gateway device as recited in claim 1, wherein the plurality of wireless transceivers is at least partially internal to the housing.

8. The gateway device as recited in claim 1, wherein the plurality of wireless transceivers is at least partially external to the housing.

9. The gateway device as recited in claim 1, wherein each of the plurality of wireless transceivers further comprise an antenna.

10. The gateway device as recited in claim 1, wherein the proximate wireless-enabled interactive programmable device comprises a device selected from the group consisting of personal computers, laptops, tablet computers, smart phones, and smart watches.

11. The gateway device as recited in claim 1, wherein the personal location device further comprises the proximate wireless-enabled interactive programmable device.

12. The gateway device as recited in claim 1, wherein the personal location device further comprises a single button personal location device.

13. The gateway device as recited in claim 1, wherein the amenity is selected from a group consisting of lighting control, temperature control, speakers, window shade control, and door security.

14. The gateway device as recited in claim 1, wherein the signal characteristics indicator is based on the beacon signal being received at the gateway device.

15. The gateway device as recited in claim 14, wherein the signal characteristics indicator is selected from a group consisting of signal strength measurements, phase angle measurements, and flight time measurements.

16. A gateway device comprising:
a housing securing a processor and memory therein, the housing being configured to be mounted within a wall located within a space, the housing including a utility box being an in-wall portion and a panel configured to mount thereto, the utility box having a plurality of sidewalls and a rear wall;
the panel forming a front portion of the housing, the panel including vents, the panel configured to mount substantially flush with the wall;
a busing architecture communicatively interconnecting the processor and the memory;
a first physical port secured at the housing and coupled to the busing architecture, the first physical port configured to provide a physical wired interface for data and power to the gateway device, the first physical port being located at the rear wall in the utility box;
a plurality of wireless transceivers associated with the housing and coupled to the busing architecture, the plurality of wireless transceivers configured to communicate via a plurality of wireless standards;
the first physical port providing a power connection to the gateway device;
the first physical port providing a data link to a server, the server managing a geolocation and safety network including a plurality of gateway devices;
at least one of the plurality of wireless transceivers being configured to communicate with a proximate wireless-enabled interactive programmable device;
at least one of the plurality of wireless transceivers being configured to communicate with a proximate amenity, the proximate amenity being co-located with the gateway device at the space; and
the memory accessible to the processor, the memory including processor-executable instructions that, when executed, cause the processor to:
receive and process a beacon signal including a personal location device identification, and
generate a gateway signal including the personal location device identification, a gateway device identification, and signal characteristics indicator.

17. The gateway device as recited in claim 16, wherein the first physical port further comprises an RJ45 port.

18. The gateway device as recited in claim 16, wherein the first physical port comprises a connection selected from the group consisting of CAT5 connections, CAT6 connections, and Ethernet connections.

19. The gateway device as recited in claim 16, wherein the wireless standards are selected from a group consisting of infrared (IR), 802.11, 802.15, 802.15.4, 3G, 4G, Edge, Wi-Fi, ZigBee, near field communications (NFC), and Bluetooth.

20. A gateway device comprising:
 a housing securing a processor and memory therein, the housing being configured to be mounted within a wall located within a space, the housing including a utility box being an in-wall portion and a panel configured to mount thereto, the utility box having a plurality of sidewalls and a rear wall;
 the panel forming a front portion of the housing, the panel including vents, the panel configured to mount substantially flush with the wall;
 a busing architecture communicatively interconnecting the processor and the memory;
 a first physical port secured at the housing and coupled to the busing architecture, the first physical port configured to provide a physical wired interface for data and power to the gateway device, the first physical port being located at the rear wall in the utility box;
 a plurality of wireless transceivers associated with the housing and coupled to the busing architecture, the plurality of wireless transceivers configured to communicate via a plurality of wireless standards;
 the first physical port providing a power connection to the gateway device;
 the first physical port providing a data link to a server, the server managing a geolocation and safety network including a plurality of gateway devices;
 at least one of the plurality of wireless transceivers being configured to communicate with a proximate wireless-enabled interactive programmable device;
 at least one of the plurality of wireless transceivers being configured to communicate with a proximate amenity, the proximate amenity being co-located with the gateway device at the space; and
 the memory accessible to the processor, the memory including processor-executable instructions that, when executed, cause the processor to:
  receive and process user input instructions relative to the amenity from the proximate wireless-enabled interactive programmable device.

* * * * *